United States Patent
Tehranchi

(10) Patent No.: US 9,742,504 B2
(45) Date of Patent: *Aug. 22, 2017

(54) MOVABLE BARRIER OPERATOR WITH SIGNAL TRANSLATION MODULE

(71) Applicant: VIKING ACCESS SYSTEMS, LLC, Irvine, CA (US)

(72) Inventor: Ali Tehranchi, Irvine, CA (US)

(73) Assignee: VIKING ACCESS SYSTEMS, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,004

(22) Filed: Dec. 9, 2016

(65) Prior Publication Data
US 2017/0111125 A1    Apr. 20, 2017

Related U.S. Application Data

(63) Continuation of application No. 14/538,441, filed on Nov. 11, 2014, now Pat. No. 9,548,823.

(51) Int. Cl.
*H04B 15/00* (2006.01)
*H04B 17/00* (2015.01)

(52) U.S. Cl.
CPC ........... *H04B 15/005* (2013.01); *H04B 17/00* (2013.01)

(58) Field of Classification Search
CPC ........... G07C 9/00309; G07C 9/00111; G07C 9/00007; G07C 9/00103; G07C 9/00166; G07C 9/00571; G07C 9/00087; G07C 9/00896

USPC ......................................................... 340/5.7
See application file for complete search history.

(56) References Cited

U.S. PATENT DOCUMENTS

| 6,137,421 A  * | 10/2000 | Dykema ............ G07C 9/00857 340/12.28 |
| 7,688,014 B2 * | 3/2010 | Tang ........................ E05F 15/70 318/266 |
| 8,176,684 B2 * | 5/2012 | Marchetto .......... G07C 9/00182 49/360 |
| 8,981,898 B2 * | 3/2015 | Sims ...................... G08C 17/02 340/5.2 |

* cited by examiner

*Primary Examiner* — Mark Blouin
(74) *Attorney, Agent, or Firm* — Jafari Law Group, Inc.

(57) ABSTRACT

The present invention is generally a movable barrier system that employs a movable barrier operator with a signal translation module, which enhances the quality of communications between wired components of a movable barrier system, including long distance wired communications between controllers and position sensors. In an exemplary embodiment, position sensors comprising encoders are coupled to translation module for reducing electromagnetic interference or noise from various components that may otherwise interfere with the communication; error detection and error correction means may be further implemented to facilitate diagnostic monitoring of the system from a monitoring device.

15 Claims, 3 Drawing Sheets

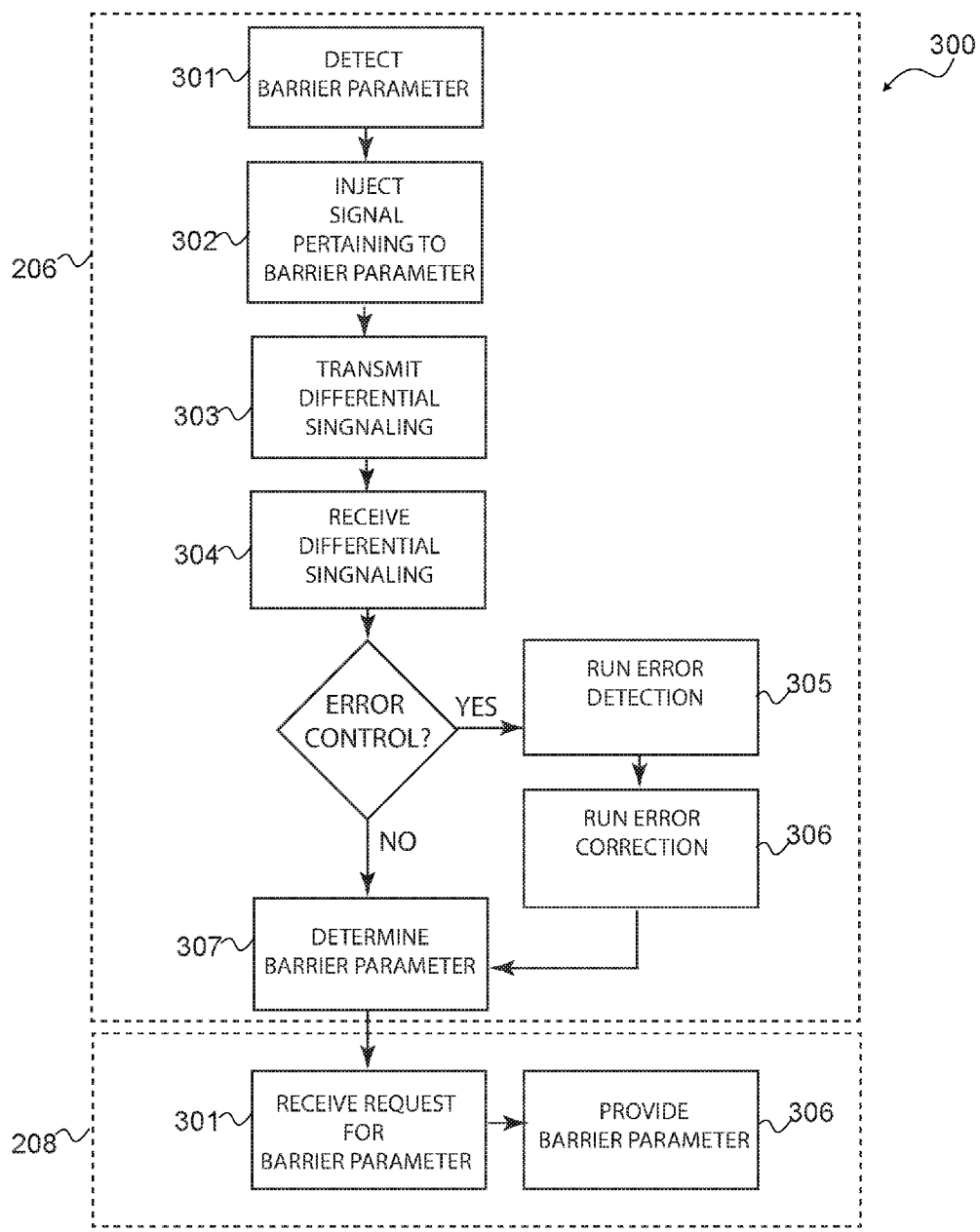

MOVABLE BARRIER OPERATOR WITH SIGNAL TRANSLATION MODULE

PRIORITY NOTICE

The present application is a continuation application, which claims priority under 35 U.S.C. §120 to U.S. patent application Ser. No. 14/538,441, filed on Nov. 11, 2014, the disclosure of which is incorporated herein by reference in its entirety.

TECHNICAL FIELD OF THE INVENTION

The present invention relates in general to a movable barrier operator with a signal translation module, and more specifically, to a movable barrier operator with a signal translation module that enhances the quality of communications between wired components of a movable barrier system, including long distance wired communications between controllers and position sensors.

COPYRIGHT & TRADEMARK NOTICE

A portion of the disclosure of this patent application may contain material that is subject to copyright protection. The owner has no objection to the facsimile reproduction by any one of the patent documents or the patent disclosures, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or to limit the scope of this invention to material associated only with such marks.

BACKGROUND OF THE INVENTION

Traditionally, technicians in the movable barrier industry are required to perform certain maintenance and repairs on movable barrier operators in the field. This responsibility requires each technician to perform tasks such as setting barrier limits, monitoring power diagnostics, or otherwise diagnosing and troubleshooting an operator's components. Often, technicians performing such regular maintenance or repairs must access operators by connecting a monitoring device to one or more components of the operator. This typically entails connecting to a controller and reading data pertaining to the one or more components. Unfortunately, the information gathered by presently existing monitoring devices in the field isn't always reliable, hence many technicians find themselves improperly troubleshooting or misdiagnosing a problem in a movable barrier system.

A very common cause of unreliable data is noise interference either from the very components of the movable barrier system, or from other components unrelated to the system but for whatever reason adjacent to the system. For example, external power lines for lights or water pumps may run adjacent to communication lines for a movable barrier system. In these scenarios noise interference leaks and interferes with the communication lines of the system and thus accurate monitoring information cannot be picked up by a technician monitoring the system.

Due to these limitations with wired communications, operators are typically configured in a manner so as to avoid having to run long distance wired communications between components of a movable barrier system. However, this is undesirable as it is often advantageous for different components of a movable barrier system to communicate between long distances.

Therefore, there is a need in the art for a more reliable means of long distance wired communication between movable barrier system components. That is, there is a need for an improved system and method of wired communication that takes into account and corrects errors caused by noise interference in the environment, in order to improve the quality and efficiency of wired communications between movable barrier system components. It is to these ends that the present invention has been developed.

BRIEF SUMMARY OF THE INVENTION

To minimize the limitations in the prior art, and to minimize other limitations that will be apparent upon reading and understanding the present specification, the present invention describes a movable barrier operator with a signal translation module that enhances the quality of communications between wired components of a movable barrier system, including long distance wired communications between controllers and position sensors.

A movable barrier operator, in accordance with an exemplary embodiment of the present invention, comprises: a motor configured to move a barrier; one or more sensors for generating one or more signals concerning one or more parameters of the barrier; a translation module for reducing electromagnetic interference, wherein the translation module is configured to: receive the one or more signals, and generate a differential signaling transmission concerning the one or more signals; and a controller situated at a remote control board, the controller configured to: receive the differential signaling transmission concerning the one or more signals from the translation module, generate data concerning the one or more signals, and provide the data concerning the one or more signals via a user interface.

A movable barrier operator, in accordance with another exemplary embodiment of the present invention, comprises: a first module, including: a motor configured to move a barrier; one or more sensors for generating one or more signals concerning one or more parameters of the barrier; and a first translation module for reducing electromagnetic interference, wherein the first translation module is configured to: receive the one or more signals, generate a differential signaling transmission concerning the one or more signals, and transmit the differential signaling transmission concerning the one or more signals to a control board; and a second module situated remote from and in wired communication with the first module, the second module comprising the control board and including: a second translation module configured to receive, from the first module, the differential signaling transmission concerning the one or more signals, and a controller situated at the control board, the controller configured to: generate data concerning the one or more signals, and provide the data concerning the one or more signals via a user interface.

A method for facilitating long distance communication in a movable barrier system, in accordance with practice of the present invention, comprises: detecting, by one or more sensors coupled to a movable barrier, one or more parameters of the movable barrier; generating one or more signals concerning the one or more parameters of the movable barrier; receiving the one or more signals from the one or more sensors; generating, by a first module, a differential signaling transmission concerning the one or more signals from the one or more sensors; transmitting the differential signaling transmission to a control board of a second module; receiving, by a controller situated at the control board, the differential signaling transmission; generating, by the controller, data concerning the one or more signals based on the differential signaling transmission; and providing the data concerning the one or more signals via a user interface.

It is an objective of the present invention to facilitate communication between components of a movable barrier system.

It is another objective of the present invention to provide an error detection and error correction protocol in order to enhance the diagnostic information that may be communicated between components of a movable barrier system.

It is yet another objective of the present invention to provide a tool for performing diagnostic and maintenance functions that takes into account and corrects interference or noise from system components.

It is yet another objective of the present invention to provide a tool for performing diagnostic and maintenance functions that takes into account and corrects interference or noise from non-system components.

It is yet another objective of the present invention to provide a means of obtaining data from position sensors located at long distances of a wired movable barrier system, which takes into account and corrects for any noise from environmental interference.

These and other advantages and features of the present invention are described herein with specificity so as to make the present invention understandable to one of ordinary skill in the art.

BRIEF DESCRIPTION OF THE SEVERAL VIEWS OF THE DRAWINGS

Elements and embodiments in the figures have not necessarily been drawn to scale in order to enhance their clarity and improve understanding of the invention. Furthermore, elements that are known to be common and well understood to those in the industry are not depicted in order to provide a clear view of the various embodiments of the invention.

FIG. 3 illustrates a method for facilitating long distance communication between movable barrier system components, in accordance with practice of an exemplary embodiment of the present invention.

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

In the following detailed description, a movable barrier operator may be any system that controls a barrier to an entry, an exit, or a view. The barrier could be a door for a small entity (i.e. a person), or a gate for a large entity (i.e. a vehicle), which may swing out, slide open, or roll upwards. The operator, which moves the barrier from an open position to a closed position and vice-versa, may be manual or automatic and may be controlled locally or remotely.

Generally, the present invention involves a movable barrier operator with a signal translation module that enhances the quality of communications between wired components of a movable barrier system, including long distance wired communications between controllers and position sensors. In an exemplary embodiment, a controller is configured to monitor and actuate one or more movable barriers from a remote location by adapting the one or more movable barriers (each) with a gear box and a motor mechanically coupled to the barrier for actuating movement between open and close positions. The motor (of each barrier) is further coupled to position sensors. Position sensors may include magnetic encoders or optical encoders, which may be programmed with travel limits and other parameters in order to provide for a wide range of programmed movements of each barrier. Since each movable barrier shares a controller, and the controller is installed at a remote location, away from each barrier, the components required at each movable barrier are minimized and thus the system optimized by requiring less components at each movable barrier location. Because the distance between the controller and the one or more motors it operates may be significantly long, the controller is adapted with a translation module configured to reduce electromagnetic interference or noise. For example, the translation module may facilitate differential signaling for reducing unwanted interference or noise from system components or external (non-system) components that may otherwise interfere with the communication.

Figure 1:
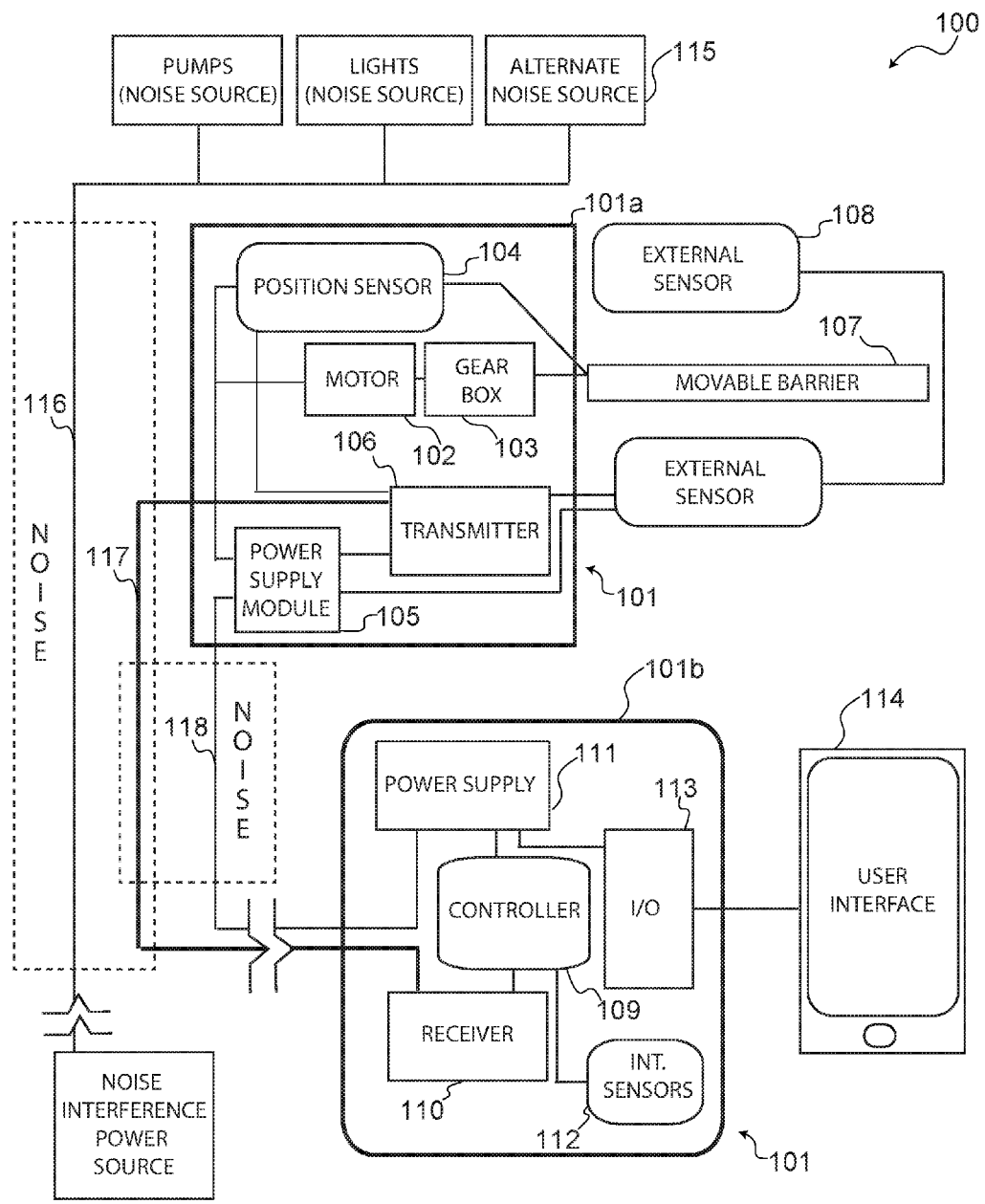
FIG. 1 illustrates a block diagram of a movable barrier system, in accordance with an exemplary embodiment of the present invention that implements a controller configured to actuate a motor from a remote location, wherein the controller and other operator components are coupled to a translation module for facilitating long distance communication.

FIG. 1 illustrates a block diagram of a movable barrier system, in accordance with an exemplary embodiment of the present invention that implements a controller configured to actuate a motor from a remote location, wherein the controller and other operator components are coupled to a translation module for facilitating long distance communication. System 100 comprises movable barrier operator 101, which includes module 101a, and module 101b. System 100 further includes external sensors 108, movable barrier 107, and monitoring device 114, which may be used to monitor, diagnose, or otherwise troubleshoot system 100. Operator 101 may actuate barrier 107 to its open position, its closed position, or to any intermediary position. Operator 101 may also start or stop movement of barrier 107 at any point along the movement track of the barrier. In one embodiment, movable barrier 107 is a horizontally sliding gate, and operator 101 may control the horizontal sliding motion of barrier 107. In another exemplary embodiment, where movable barrier 107 is a swing gate, operator 101 may control the pivot swinging motion of movable barrier 107. In any case, operator 101 and its constituent parts control movement of barrier 107, influencing movement speed, delays, the ability to open and close, and so forth.

Whereas components such as motors, gearboxes, power supplies, and internal sensors typically reside in a single operator housing, operator 101 distributes these components in different modules that comprise different housings installed at different locations. This configuration enables more efficient and cost-effective operator builds that require less components installed nearby the barriers they control; this is an advantage for several reasons, including less expenditures and economical utilization of the real estate spent on placement of the operator.

System 100 is exemplarily shown in an environment that includes external components to system 100 such as components that may be found in the field, which often produce unwanted noise or cause interference with movable barrier systems. For example, and without deviating from the scope of the present invention, non-system components including lights, pumps, or alternative components that may be installed in the same environment as system 100, may be a source of interference or noise. Therefore, system 100 implements translation modules 106 and 110 at module 101a and module 101b in order for operator 101 components to communicate via long distance conduit 117, with significantly reduced interference from noise. These translation modules are configured to reduce electromagnetic interference or noise, and may include one or more transmitters and/or receivers that implement signaling methods such as differential signaling. Thus, translation modules 106 and 110 aid operator 101's modules 101a and 101b to communicate while reducing unwanted interference from noise created by system components such as conduit 118, which system 100 utilizes to transfer power to module 101a, or noise from external non-system components such as noise generated from conduit 116, which may be a conduit to transfer power or data to external components such as landscaping lights, landscaping water pumps, or other alternative noise sources 115.

Module 101a may be located at or nearby the location of a movable barrier such as barrier 107. Typically, module 101a comprises motor 102, gear box 103, position sensors 104, power supply module 105, and translation module 106 for communicating with module 101b, where a primary power source and controller for operator 101 reside. Mechanically coupled to barrier module 101a, is movable barrier 107. Barrier 107 is, more specifically, mechanically coupled to motor 102 via gearbox 103. Furthermore, actuation of barrier 107 may be facilitated by sensors such as external sensors 108.

Motor 102 may be any type of motor suitable for actuating gear box 103 and moving barrier 107. For example, and without limiting the scope of the present invention, motor 102 may be an AC motor, a DC motor, a Lorentz motor, a Hub motor, or any other type of motor known in the art that may be suitable for actuating barrier 107. Similarly, gear box 103 may be any type of suitable gear box for mechanically coupling motor 102 to barrier 107 and facilitating movement of barrier 107.

Position sensors 104 may be any type of sensors for detecting a barrier parameter and generating signals pertaining to barrier 107. Typically, position sensors may detect a travel limit or a position of barrier 107 in order to communicate with module 101b. This way, module 101b may send commands to motor 102 for actuating barrier 107 accordingly. Position sensors 104 may comprise of any type of sensors to facilitate deterring and controlling barrier 107's position. For example, and without deviating from the scope of the present invention, position sensors 104 may include magnetic encoders, optical encoders, potentiometric position sensors, capacitive position sensors, or any other type of position sensors that may be suitable for determining a position of barrier 107.

In an exemplary embodiment, position sensors 104 include magnetic encoders or optical encoders that are adapted to determine a barrier position for barrier 107 and communicate with control module 101b in order to actuate barrier 107 to the desired position, and in order for control module 101b to gather pertinent parameter data concerning barrier 107 such as travel limit position, barrier speed, acceleration, or any other relevant barrier parameters that may be useful in maintaining, troubleshooting, or otherwise operating system 100.

Power supply module 105 may be any hardware designed to receive and regulate power from power supply 111 and distribute that power to the components of module 101a. Without limiting or deviating from the scope of the invention, power supply module 105 may include a rechargeable battery and may be used only for backup purposes. For example, and without deviating from the scope of the present invention, power supply module 105 may include a battery for backing up data and providing power to the external sensors and position sensors in the event that power and/or communication cables are disconnected or damaged. In one exemplary embodiment, power supply module 105 includes a backup power source, in another exemplary embodiment, power supply module 105 does not include a rechargeable battery, and components of module 101a may draw power directly from power supply 111 via conduit 118, which supplies power to module 101a from module 101b.

Translation module 106 typically transmits information gathered at module 101a to module 101b, where translation module 110 receives the information and supplies it to controller 109. The translation modules allow operator 101 to implement signal transmitting methods such as differential signaling in order to provide clearer transmissions of information between the system components. Thus, translation module 106 may include a transmitter or differential driver configured to communicate with a receiver at translation module 110.

External sensors 108 are typically electronically connected to operator 101 and provide a variety of information pertaining to system 100. External sensors 108 may comprise of obstruction sensors, loop-induction sensors, or any other type of sensors adapted for generating a signal to either stop or actuate movement of barrier 107. For example, external sensors 108 may generate a signal that indicates to the system that a vehicle is approaching barrier 107 and that barrier 107 should remain open. Because these sensors are typically located near a movable barrier, it may be desirable to connect external sensors 108 to module 101a so that signals or data generated from external sensors 108 may be driven via translation module 106 in order to preserve the information being transmitted to module 101b via conduit 117.

Module 101b of operator 101 is located at a remote location (from module 101a and barrier 107). Control module 101b houses the remaining components of operator 101 required to actuate movement of movable barrier 107. Module 101b comprises controller 109, translation module 110, power supply 111, internal sensors 112, and an input/output interface (I/O 113) to control and monitor operator 101 along with the remainder of system 100.

Controller 109 sends signals to motor 102, which in turn actuates gear box 103 to move barrier 107. Often, this signal may be triggered by activation of either external sensors 108 (e.g. when a vehicle approaches barrier 107) or user input (e.g. a user sends a signal to actuate barrier 107). Controller 109 may include one or more processors that generally process, relay, and carry out either pre-programmed or user-entered commands pertaining to operator 101. In the present exemplary embodiment, controller 109 is an integral component in carrying out the multitude of important tasks programmed or requested by a technician or user. Because controller 109 is physically located remotely from module 101a, controller 109 may be configured to communicate with module 101a via a communications conduit 117, which connects module 101a to module 101b. As mentioned above, to facilitate this communication, translation modules 106 and 110 may be configured to reduce unwanted noise or electromagnetic interference from conduits 116 or 118.

Translation module 110 may include a receiver to complement a differential driver located at translation module 106. Translation modules 106 and 110 may facilitate a variety of differential signaling methods of transmitting information electronically in order to reduce electromagnetic interference generated from conduit 118 or conduit 116. The protocol for communication between module 101a and module 101b may be any type of communication protocol from a simple protocol typically used in an RS-232 port to a more sophisticated protocol such as TCP protocol. In order to implement the desired protocol, a controller with a processor or microprocessor may be implemented—as discussed in more detail below with reference to FIG. 2.

Power supply 111 may be the primary source of power for operator 101. In one embodiment, power supply 111 is an internal component of operator 101 and may draw power through a power cable from a typical power source. Power supply 111 may provide power to components of module 101a such as motor 102, differential driver 106, and external sensors 108. As discussed above, power supply 111 may also supply power to a rechargeable battery as a back-up power supply, which may be located at module 101a or alternatively at module 101b, without limiting the scope of the present invention.

Internal sensors 112 comprise of sensors pertaining to the operator's internal components, each of which may be coupled to system 100's controller 109. For example, and without limiting or deviating from the scope of the present invention, internal sensors 112 may include surge protection sensors, voltage sensors, current sensors, amperage sensors, or any other type of internal sensor that may provide status or diagnostic information pertaining to system 100. Utilizing several types of sensors throughout system 100 facilitates optimal functionality of the system and provides additional information to an operator user.

I/O 113 may be coupled to controller 109 and serves to connect directly to particular components of operator 101. For instance, a user may use I/O 113 to connect to system 100's radio station, loop connector, open commands, guard station, and master/slave relationships, among any number of other components and features that could be connected to through I/O 113. In an exemplary embodiment, IO 113 may be utilized for connecting a monitoring device such as monitoring device 114. Monitoring device 114 is typically configured to request and gather data from controller 109 in order to offer users with the required information to perform diagnostic tests, provide monitoring of system 100, and provide general maintenance to system 100 components, including operator 101. For example, monitoring device 114 may provide a user with information pertaining to barrier 107 such as, but not limited to, barrier movement speed, current position, open position, closed position, length of time to remain open, slow down speed, and so forth.

Other components not shown in FIG. 1 but that may nonetheless make up operator 101 may include movable barrier subsystems such as slave modules controlled by controller 109 of operator 101. Such slave modules may control access to a location by being mechanically coupled to additional movable barriers. Furthermore, other conduits such as conduit 117 may communicate with module 101b of operator 101 so that these slave modules would be identical to module 101a. For example, in one embodiment, operator 101 is a master operator and is configured to control at least one other barrier which is coupled to yet another barrier, for example tandem gates on the same property. Thus, a technician with access to module 101b may glean diagnostic data and set controls and parameters for the slave modules that are in communication with module 101b.

Figure 2:
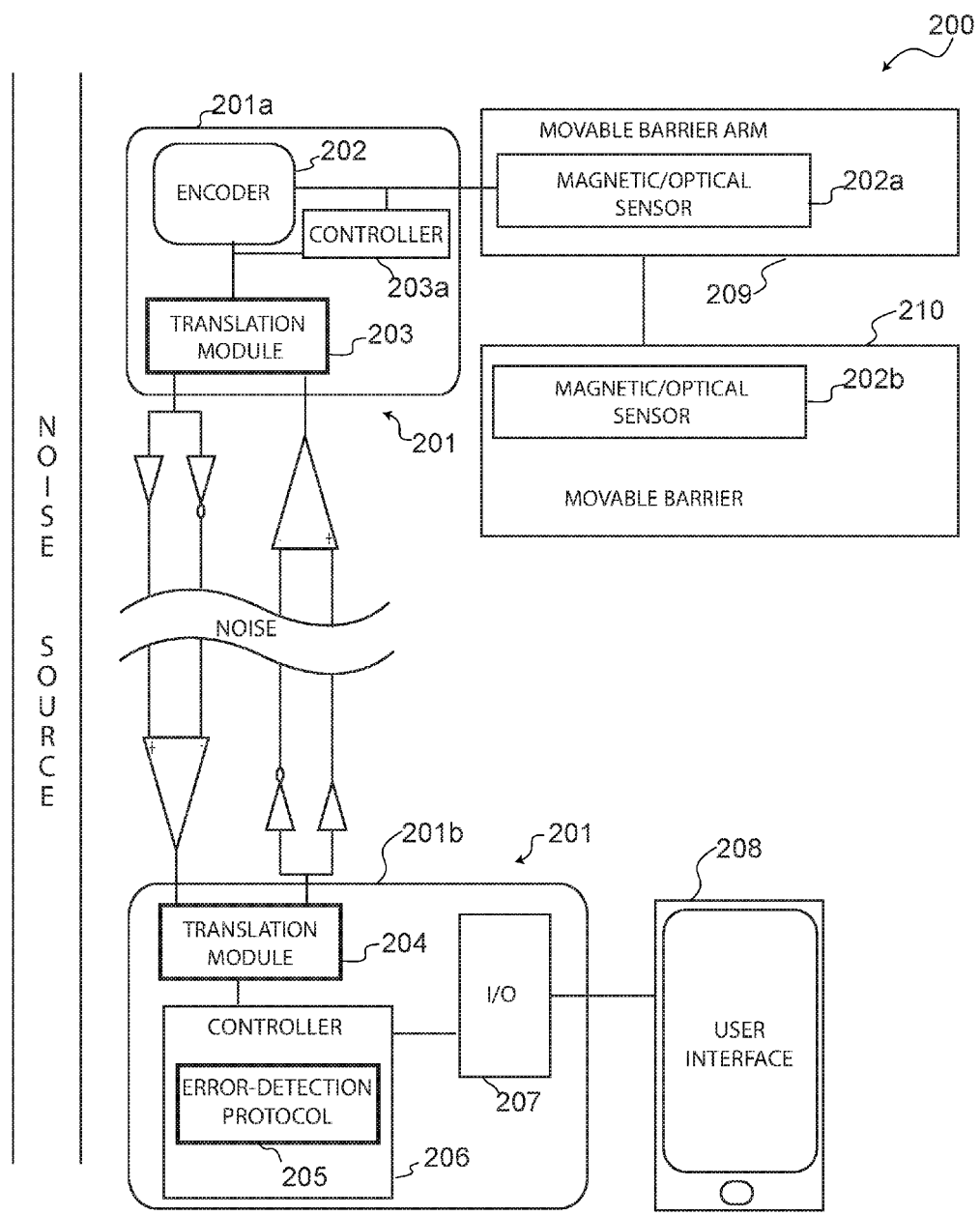
FIG. 2 illustrates a block diagram of a movable barrier system, in accordance with another exemplary embodiment of the present invention that utilizes encoders to monitor and control a movable barrier's travel limits, wherein a long distance wired communication between the controller and encoder is facilitated with a translation module.

Turning to the next figure, FIG. 2 illustrates a block diagram of a movable barrier system, in accordance with another exemplary embodiment of the present invention that utilizes encoders to monitor and control a movable barrier's travel limits, wherein a long distance wired communication between the controller and encoder is facilitated with a translation module. More specifically, FIG. 2 shows system 200, which generally comprises of operator 201, barrier 210, and monitoring device 208.

Operator 201 includes a barrier module (barrier module 201a) and a controller module (control module 201a) that utilize translation modules to facilitate a long distance wired communication, which reduces electromagnetic interference or noise.

Barrier module 201a includes encoder 202, controller 203a, and translation module 203, along with other components that actuate movement of barrier 210 such as a motor, a gear box, and obstruction sensors (not shown). Typically, encoder 202 may be coupled to movable barrier arm 209, which supports and enables movement of barrier 210. Components 202a and 202b of encoder 202 may be placed on a track along arm 209 and barrier 210. As barrier 210 is actuated and moves between an open position and a close position, components 202a and 202b register a change in their respective positions and generate a pertinent signal. Different components may be implemented, as there are a wide range of different types of encoders, which may be used with the present invention. For example, and without limiting the scope of the present invention, in one embodiment, encoder 202 may comprise an optical encoder that utilizes a light source and photo detector for components 202a and 202b. In another embodiment, encoder 202 may comprise a magnetic encoder that utilizes magnetic poles and a magnetic sensor for components 202a and 202b. In yet another embodiment, encoder 202 may comprise a capacitive encoder that utilizes a disk and electrodes for components 202a and 202b to measure change in capacitance in order to determine a position of the barrier. In still another embodiment, encoder 202 may comprise a rotary encoder or shaft encoder that utilizes an electro-mechanical device for components 202a and 202b. In short, a wide variety of encoders may be implemented depending on the type of barrier and movement of barrier that is desired for a particular application. Regardless of type of encoder used, a simple microprocessor may determine the position of the barrier and sends this information to translation module 203, which facilitates a signaling method such as differential signaling between barrier module 201a and control module 201b.

Translation module 203 may include a transmitter or differential driver that may be configured for transmitting information electrically with a pair of complementary signals via paired wires or a differential pair. As such, in one embodiment, translation module 203 includes a transmitter or differential driver configured to communicate with translation module 204, and translation module 204 includes a receiver for receiving the pair of complementary signals transmitted by translation module 203. In alternative embodiments (i.e. such as the operator depicted in FIG. 2), translation module 203 may be configured to transmit and receive communications with translation module 204 thereby facilitating bi-directional communications between barrier module 201a and control module 201b. In such embodiments, translation module 203 and translation module 204 may each include differential drivers and receivers for enabling bi-directional communication that implements methods such as differential signaling.

Furthermore, and without limiting the scope of the present invention, controller 203a may be included in barrier module 201a in order to facilitate a communication between the sensors or encoder and a control board located at control module 201b. For example, controller 203a may include a processor or microprocessor to handle the protocol, which facilitates the communication via the translation module—sending sensor data back to a control board located at control module 201b. Furthermore, this configuration may enable error-checking between the modules of the operator.

As mentioned above, translation modules 203 and 204 may include one or more drivers and receivers for implementing a differential signaling method that allows the operator's modules to communicate more clearly by significantly reducing noise that otherwise may interfere with the communication. Hence, translation modules 203 and 204 may be configured to receive one or more signals from one or more system components, generate a pair of complementary signals from the one or more signals, and transmit the complementary signals from one module to the other.

Control module 201b comprises controller 206 and translation module 204, and is configured for communicating with barrier module 201a in order to govern the operation of operator 201. Moreover, a user may connect to control module 201b (e.g. via monitoring device 208) and glean information pertaining to system 200, change parameters of operator 201, make adjustments, run diagnostic tests, troubleshoot problems, or perform any other pertinent maintenance functions typically required in the field. The translation modules reduce noise interference and facilitate reading the data or information exchange between control module 201b and barrier module 201a. Similarly, the translation modules prevent noise from interfering with the adequate functioning of operator 201.

Control module 201b may be configured to implement an error detection and error correction protocol in order to verify and/or correct any information that is communicated between the modules of system 200, which may include other slave modules for other barriers. Typically, controller 206 processes or executes error detection protocol 205, and may include a processor or microprocessor to run or execute error-detection and error correction programs in analyzing signals or data received and sent between barrier module 201a and 201b.

Once any signals or data have been analyzed using error-detection protocol 205, controller 206 may store and the information to a monitoring device such as monitoring device 208.

FIG. 3 illustrates a method for facilitating long distance communication between movable barrier system components, in accordance with practice of an exemplary embodiment of the present invention. More specifically, FIG. 3 illustrates a flow chart of method 300, which is employed by and between two modules of an operator, which have been adapted with translation modules and a controller for executing an error-detection protocol, for facilitating a wired communication between a controller and encoders (and sensors) that are used to monitor and alter movable barrier parameters; the translation modules facilitate the communication by cancelling out noise from electromagnetic sources that may otherwise interfere with the communication. Method 300 is explained in the order shown below; however, the following steps may be taken in any other conceivable sequence without deviating from the scope of the present invention.

Generally, the method may comprise: detecting, by one or more sensors coupled to a movable barrier, one or more parameters of the movable barrier; generating one or more signals concerning the one or more parameters of the movable barrier; receiving the one or more signals from the one or more sensors; generating, by a first module, a differential signaling transmission concerning the one or more signals from the one or more sensors; transmitting the differential signaling transmission to a control board of a second module; receiving, by a controller situated at the control board, the differential signaling transmission; generating, by the controller, data concerning the one or more signals based on the differential signaling transmission; and providing the data concerning the one or more signals via a user interface.

Hence, with reference to FIG. 3, in step 301, a barrier parameter may be detected, such as a barrier position. Again, this may be achieved by implementing encoders and sensors along a barrier movement module. In one embodiment, magnetic encoders or optical encoders are utilized in order to determine a barrier position along a movable barrier track. A microprocessor may generate data or a signal pertaining to the barrier parameter, such as a signal or data pertaining to the travel limit position of the movable barrier. Of course, other barrier parameters may be detected as well, including barrier speed, acceleration, or any other useful parameter that a system may want to detect and be configured with the proper sensors to do so.

In step 302, information (i.e. concerning one or more parameters) that is gathered from sensors or encoders may be received and/or one or more signals concerning the one or more parameters of the movable barrier may be generated. Thus, once the information is received, a signal pertaining to a barrier parameter may be generated and injected into the translation modules for transmission to the remote control board.

In step 303, the signals from the sensors or encoders are received at a first translation module, where (for example) complementary signals may be generated in order to facilitate a differential signaling method of transmission. The generated complementary signals are thus transmitted to a second translation module situated at a location remote from the first translation module.

In step 304, the signals or data are received by the second translation module of the remote control module of the operator. A control board at the remote control module may implement an error-detection an error-correction protocol as well. For example, a determination may be made at step 304, which includes determining whether to implement an error control protocol. In some embodiments, it may be desirable to always run an error control protocol, while in alternative embodiments it may be more efficient to bypass error correction and simply determine the barrier parameter from the translated signals or data. On the other hand, it may be desirable to implement error control and thus, in steps 305 and 306 one or more programs may be executed in order to run error detection and error correction algorithms in order to correct for any errors in the transmitted signals or data.

In step 307, once the translated signals or data are received, the barrier parameter is determined and stored in a local memory by the operator's controller. In this way, a user may later access the operator via a monitoring interface, such as a monitoring device or a display on the operator, and request access for the barrier parameter in step 308. In step 309, after receiving the request, the barrier parameter may be provided to the user via the monitoring interface.

A movable barrier operator with a signal translation module has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A movable barrier operator, comprising:
 a motor configured to move a barrier;
 one or more sensors for generating one or more signals concerning one or more parameters of the barrier;
 a translation module for reducing electromagnetic interference, wherein the translation module is configured to:
   receive the one or more signals, and
   generate a differential signaling transmission concerning the one or more signals; and
 a controller situated at a remote control board, the controller configured to:
   receive the differential signaling transmission concerning the one or more signals from the translation module,
   generate data concerning the one or more signals, and
   provide the data concerning the one or more signals via a user interface.

2. The movable barrier operator of claim 1, wherein the one or more sensors comprise of an encoder coupled to the barrier.

3. The movable barrier operator of claim 2, wherein the encoder coupled to the movable barrier comprises a magnetic encoder having magnetic poles and a magnetic sensor for detecting the one or more parameters of the barrier.

4. The movable barrier operator of claim 2, wherein the encoder coupled to the movable barrier comprises an optical encoder having a light source and a photo detector for detecting the one or more parameters of the barrier.

5. The movable barrier operator of claim 1, wherein the user interface comprises a display of a monitoring device coupled to the controller.

6. The movable barrier operator of claim 1, wherein the control board at the remote location further comprises a second translation module for reducing electromagnetic interference, the second translation module configured to:
 receive one or more signals concerning data generated by the controller,
 generate a differential signaling transmission concerning the data generated by the controller, and
 transmit the differential signaling transmission concerning the data generated by the controller to the translation module located near the movable barrier.

7. The movable barrier operator of claim 6, wherein the controller is further configured to implement an error control protocol for detecting and correcting errors found in the one or more signals received from the translation module.

8. The movable barrier operator of claim 1, wherein the user interface comprises a display of a monitoring device coupled to the controller.

9. A method for facilitating long distance communication in a movable barrier system, comprising:
 receiving one or more signals from one or more sensors concerning one or more parameters of the movable barrier system;
 generating, by a first module, a differential signaling transmission concerning the one or more signals from the one or more sensors;
 transmitting the differential signaling transmission to a control board of a second module;
 receiving, by a controller situated at the control board, the differential signaling transmission; and
 generating, by the controller, data concerning the one or more signals based on the differential signaling transmission.

10. The method of claim 9, further comprising:
 providing the data concerning the one or more signals via a user interface.

11. The method of claim 9, further comprising:
 generating, by the controller, one or more signals concerning the data;
 generating a second differential signaling transmission concerning the data generated by the controller; and
 transmitting the second differential signaling transmission concerning the data generated by the controller to the first module.

12. The method of claim 9, further comprising:
 executing an error control protocol for detecting and correcting errors in communications between the first and second modules.

13. The method of claim 9, wherein the one or more sensors comprise of:
 an encoder coupled to the barrier.

14. The method of claim 13, wherein the encoder coupled to the barrier comprises a magnetic encoder having magnetic poles and a magnetic sensor for detecting the one or more parameters of the barrier.

15. The method of claim 13, wherein the encoder coupled to the movable barrier comprises an optical encoder having a light source and a photo detector for detecting the one or more parameters of the barrier.

* * * * *